United States Patent [19]

Schulte et al.

[11] Patent Number: 4,653,835

[45] Date of Patent: Mar. 31, 1987

[54] ELECTRICAL PLUG-COUPLER-SYSTEM

[75] Inventors: Siegfried Schulte; Manfred Böing, both of Lüdenscheid, Fed. Rep. of Germany

[73] Assignee: Firma Schulte-Elektrotechnik GmbH & Co. KG, Fed. Rep. of Germany

[21] Appl. No.: 836,147

[22] Filed: Mar. 4, 1986

[30] Foreign Application Priority Data

Mar. 4, 1985 [DE] Fed. Rep. of Germany ..... 35075252

[51] Int. Cl.[4] .............................................. H02B 1/12

[52] U.S. Cl. ................................ 339/128; 339/94 A; 339/130 C

[58] Field of Search .......... 339/94 A, 126 R, 126 RS, 339/128, 129, 130 R, 130 C; 248/27.3

[56] References Cited

U.S. PATENT DOCUMENTS 2,655,638 10/1953 Allen .................................... 339/28
3,697,025 10/1972 Edwards ........................... 248/27.3
3,824,524 7/1974 Glover ................................ 328/186

FOREIGN PATENT DOCUMENTS 2429259.8 1/1985 Fed. Rep. of Germany .

*Primary Examiner*—Eugene F. Desmond
*Attorney, Agent, or Firm*—Bacon & Thomas

[57] ABSTRACT

An electrical plug-coupler-system with a cylindrical plug socket comprising a collar with an external thread, the coupler of which engages in the collar and can be fixed with a cap on the external thread of the collar. The technical problem is the sealing of the interior against emerging oil and against entering water, especially pressurized water at diving pumps. The insert sleeve of the plug socket has several barbed tongues at a front ring, the ridges of the tongues facing an end shoulder of the collar by leaving a peripheral gap open which receives an inner edge of an installation hole as well as a sealing washer. A nut is screwed firmly onto the external thread of the collar for fixing the sealing washer. The coupler cap tightens the front edge of the collar by a ring surface.

8 Claims, 13 Drawing Figures

ELECTRICAL PLUG-COUPLER-SYSTEM

BACKGROUND OF THE INVENTION

1. Field of the Invention

The invention relates to an electrical plug-coupler-system with a cylindrical plug socket comprising a collar with an external thread, the coupler of which engages in the collar and can be fixed with a cap on the external thread of the collar.

2. Description of the Prior Art

The sealing of an electrical connection is often very difficult as far as pumps and especially diving pumps are concerned because on the one hand the interior of the pump has to be sealed against emerging oil and on the other hand against entering water especially pressurized water. It has become apparent that the leading-in through the pump casing is most critical.

SUMMARY OF THE INVENTION

One object of the invention is the sealing of the interior against emerging oil and against entering water, especially pressurized water at diving pumps.

The object is solved in that the insert sleeve of the plug socket has several barbed tongues at a front ring, the ridges of the tongues facing an end shoulder of the collar by leaving a peripheral gap open which receives an inner edge of an installation hole as well as a sealing washer, that a nut is screwed firmly onto the external thread of the collar for fixing the sealing washer, and that the coupler cap tightens the front edge of the collar by a ring surface.

The invention differs in an extraordinary way from the prior art as the click-in assembly can be effected from the outside of the casing of the appliance, and further this ensures a complete sealing by safe fixing from the assembly side. This is of great importance in order to assure a labour-saving assembly and a safe function of the appliance. Such an assembly is ensured after connecting the leads.

In order to fix the plug socket in an installation hole every tongue has a ridge, projecting outwards.

In order to provide the highest possible rigidity of the tongues, although the walls are only thin, every tongue is reinforced by ribs, running in axial direction.

The plug also can be used as plug with an individual enclosure independent from a casing of the appliance, when the peripheral gap receives a supporting ring and an inner flange of a flexible enclosure as well as the before mentioned sealing washer.

In order to ensure that no water can enter around the plug pins the same are moulded, respectively injection moulded directly into a cross-wall of the plug socket.

In order to ensure an impermeable connection of the coupler, the cylindrical enclosure of the coupler has an outer shoulder, the cylindrical coupling housing is provided with an outer ring ridge which is overlapped by an elastic face profile of the enclosure enabling an iner flange of the cap of the coupler to abut the face profile, and a ring surface of the face profile is provided as sealing surface.

BRIEF DESCRIPTION OF THE DRAWINGS

Preferred embodiments of the invention are explained with reference to the attached drawings showing.

DESCRIPTION OF THE PREFERRED EMBODIMENT

Figure 1:
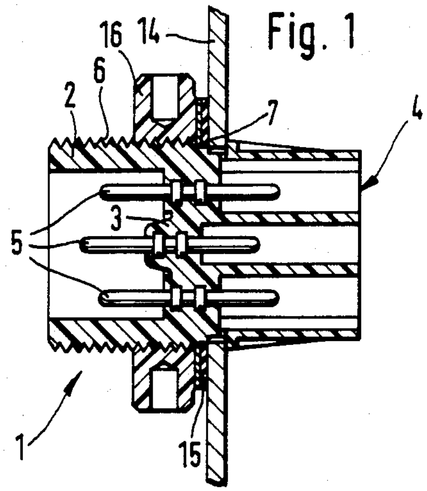
FIG. 1 a cut across a plug of the system.
Figure 4:
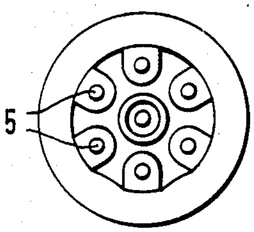
FIG. 4 a side view of FIG. 2 from the left side.
Figure 2:
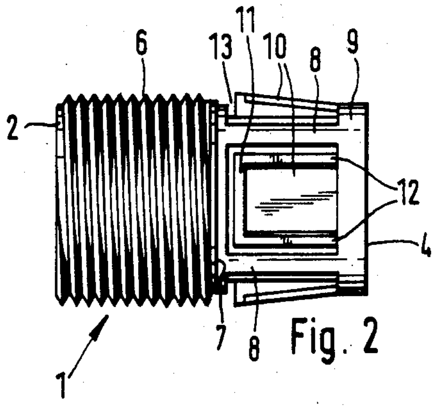
FIG. 2 a view of the plug socket.
Figure 3:
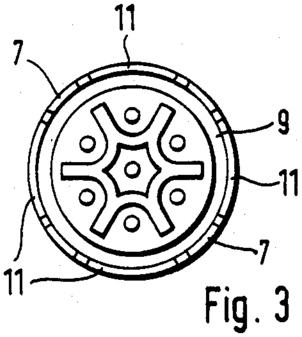
FIG. 3 a side view of FIG. 2 from the right side.

The plug of the system comprises a mostly cylindrical socket 1 with a collar 2, a cross wall 3 and an insert sleeve 4. The plug socket 1 is a thermoplastic moulded part. Plug pins 5 of the necessary number and arrangement have been inserted in the mould die and consequently they are embedded tightly.

Figure 5:
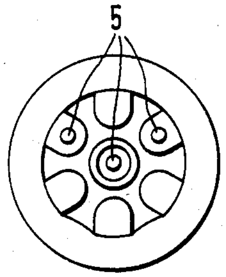
FIGS. 5 to 7 different configurations of the plug pins.
Figure 6:
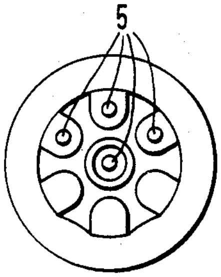
Figure 7:
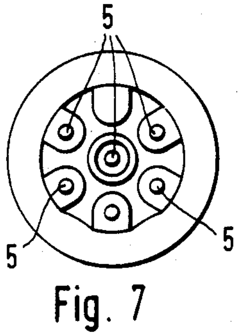
Figure 11:
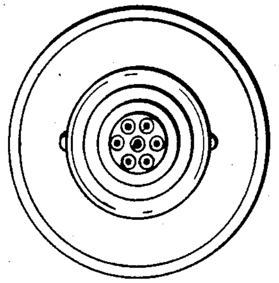
FIG. 11 a side view of FIG. 10.
Figure 13:
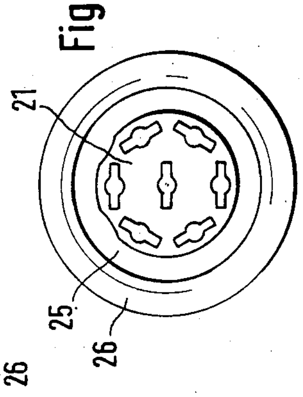
FIG. 13 a side view of FIG. 12.

The plug pins 5 are separated in the connector chamber from eachother by webs and consequently are arranged in separate chambers in order to secure the necessary insulation paths. FIGS. 5 to 7 show possible configuration with three, four and six pins. The configuration depends on the corresponding conductor system.

The collar 2 has an external thread 6 and an end shoulder 7 set up towards the interior. The insert sleeve 4 has an annular front ring 9 on longitudinal webs 8. The front ring 9 bears tongues 10 always arranged between the longitudinal webs 8 and having one ridge 11 projecting outwards. Further the tongues 10 are reinforced by ribs 12, running in axial direction. Four longitudinal webs 8 and four tongues 10 each are provided in this embodiment. The ridge 11 are arranged opposite to the end shoulder 7 of the collar 2 by leaving a peripheral gap 13 open.

FIG. 1 shows a wall section 14 of a pump casing with an installation hole. Its interior edge lies in the peripheral gap 13. At the outside of the wall section 14 a sealing washer 15 is arranged in the peripheral gap 13 abutting against the end shoulder 7. The circular line encircling the ridges 11 has a greater diameter than the inner diameter of the gap 13.

The fixing of the plug socket 1 in the wall section 14 is made in such a manner that the plug socket is pressed or inserted into the installation hole with its front ring 9 ahead, after first having put the sealing washer into the peripheral gap 13. After pressing-in the resilient tongues 10 completely they spring back over the interior edge of the installation hole with their ridges 11, as it can be seen from FIG. 1. This is possible from the outside of the casing of the appliance and from the connection side of the plug. A protection against rotation is made in the usual manner. Then a nut 16 is screwed onto the external thread 6 of the collar 2 and tightened. Thus the sealing washer 16 is pressed tightly in order to ensure a complete sealing of the interior of the pump casing. Accordingly no oil can emerge from the pump casing, nor can any water enter it.

The direct mounting of the plug into the wall of the pump casing is explained in FIG. 1.

Figure 9:
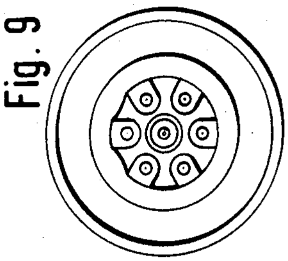
FIG. 9 a side view of FIG. 8.
Figure 8:
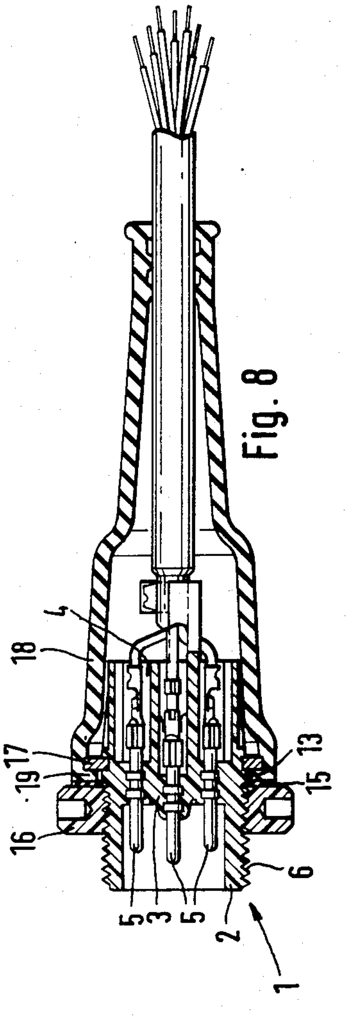
FIG. 8 a cut through a plug with an enclosure.

An individually sealed cable also may be brought out of the pump casing and may be provided with a plug according to the invention as shown in FIGS. 8 and 9. A supporting ring 17 is arranged here in the peripheral gap 13 which is overlapped by an iner flange 19 of a flexible enclosure 18. The sealed tightening of the iner flange 19 is made as described already with the nut 16. A complete sealing also is guaranteed in this case.

Figure 10:
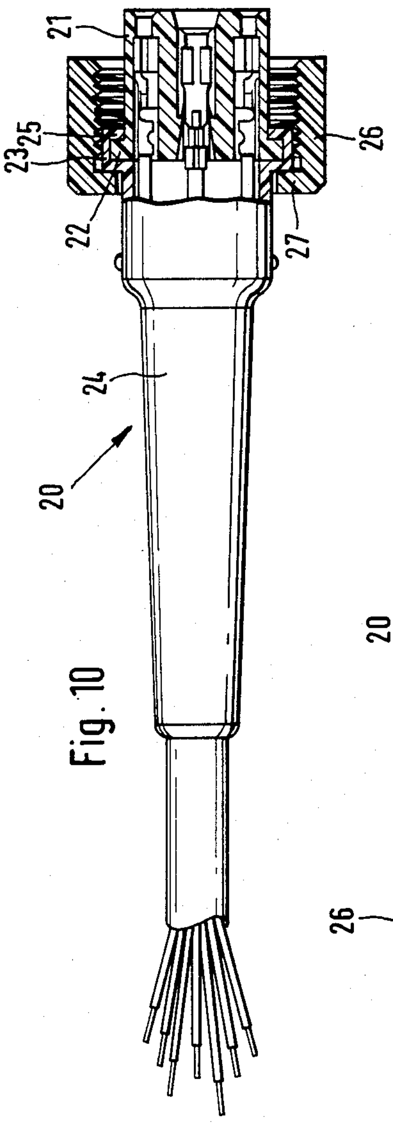
FIG. 10 a coupler of the system, partly cut.
Figure 12:
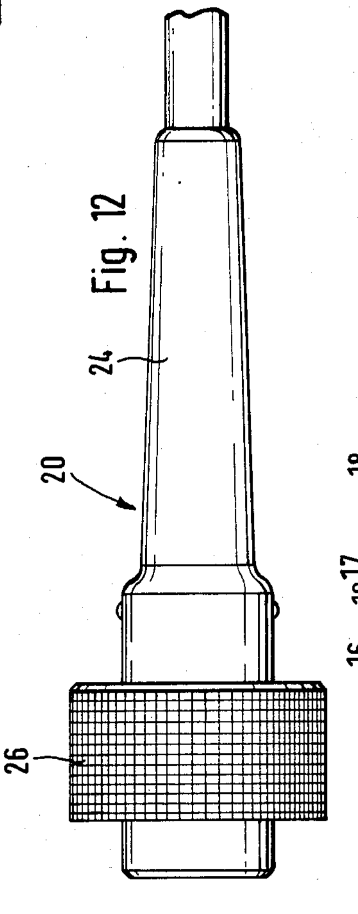
FIG. 12 a view of the coupler.

The coupler 20 of the plug-coupler-system has been shown in FIG. 10. A coupling socket 21 receives the connector sleeves. A face profile 23 of the flexible enclosure overlaps the outer ring ridge 22 of the coupling socket 21. The face profile 23 ends in a radially arranged ring surface 25 lying on the outer ring ridge 22. A cap 26 overlaps the face profile 23 with an inner flange 27. The cap 26 has an internal thread fitting the external thread of the collar 2.

The coupler is plugged as usual into the plug. The cap is screwed on. Thus a secure tightening is achieved. The sealing mainly is effected between the front surface of the collar and the ring surface 25.

We claim the following:

1. An electrical plug coupler comprising:
(a) a hollow, annular collar portion having a threaded outer surface and defining an end shoulder;
(b) a cross-wall extending across the collar portion;
(c) at least one electrical plug pin attached to and extending through the cross-wall;
(d) an insert sleeve portion having a distal end; and,
(e) at least one resilient tongue attached to the insert sleeve portion at a first end and a second end defining a ridge extending radially outwardly a greater distance than the end shoulder and axially spaced therefrom so as to define a peripheral mounting gap therebetween.

2. The electrical plug coupler according to claim 1 wherein the ridge is adapted to bear against one side of a wall to which the plug coupler is attached and further comprising nut means threadingly engaged with the collar portion so as to bear against an opposite side of the wall to retain the plug coupler in assembled relationship therewith.

3. The electrical plug coupler according to claim 2 further comprising a sealing washer disposed on the collar portion and interposed between the nut means and the wall.

4. The electrical plug coupler according to claim 1 further comprising:
(a) an annular supporting ring disposed in the gap between the ridge and the end shoulder having a periphery extending radially outwardly from the ridge;
(b) a flexible enclosure extending over the insert sleeve portion, and the supporting ring; and,
(c) radially inwardly extending flange means defined by an end of the flexible enclosure so as to contact one side of the supporting ring.

5. The electrical plug coupler according to claim 4 further comprising nut means threadingly engaged with the collar portion so as to clamp the flange means between the nut means and the supporting ring.

6. The electrical plug coupler according to claim 5 further comprising a sealing washer interposed between the nut means and the flange means.

7. The electrical plug coupler according to claim 1 further comprising:
(a) a coupling socket adapted to fit within the coupler portion, one end of the coupling socket having a radially outwardly extending flange;
(b) a second collar having a second radially inwardly extending flange in contact with the flange on the coupling socket and a threaded portion adapted to engage the threaded outer surface of the collar portion; and
(c) at least one electrical connector sleeve attached to the coupling socket so as to engage the at least one electrical plug pin.

8. The electrical plug coupler according to claim 7 further comprising an enclosure having an end portion engaging the radially outwardly extending flange and interposed between the second collar and the radially outwardly extending flange.

* * * * *